Oct. 20, 1925.

C. E. BRIDGES

AUTOMATIC AIR GAUGE

Filed March 10, 1925

1,558,428

Inventor
C. E. Bridges
by Hazard and Miller
Attys.

Patented Oct. 20, 1925.

1,558,428

UNITED STATES PATENT OFFICE.

CHARLES E. BRIDGES, OF LOS ANGELES, CALIFORNIA.

AUTOMATIC AIR GAUGE.

Application filed March 10, 1925. Serial No. 14,461.

*To all whom it may concern:*

Be it known that I, CHARLES E. BRIDGES, a citizen of the United States, residing at Los Angeles, in the county of Los Angeles and State of California, have invented new and useful Improvements in Automatic Air Gauges, of which the following is a specification.

This invention relates to automatic air gauges particularly adapted to use in the filling and testing of pneumatic tires.

An object of the invention is to provide an automatic air gauge adapted to be disposed at the discharge end of a compressed air supply hose and to be coupled with the valve stem of a tire for the purpose of supplying air to the tire.

A further object is to incorporate in an automatic air gauge of the type described, manually operated means for regulating the air pressure admitted to the tire, and to afford an accurate scale for setting the gauge so that a predetermined air pressure will be applied.

Other objects and advantages will be made manifest in the following specification of an embodiment of the invention illustrated in the accompanying drawings, in which.

Figure 1:
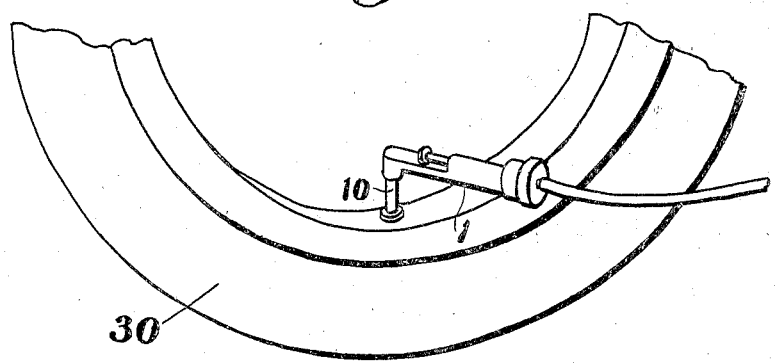
Figure 1 is a perspective of the automatic air gauge as applied to the valve stem of a tire.
Figure 2:
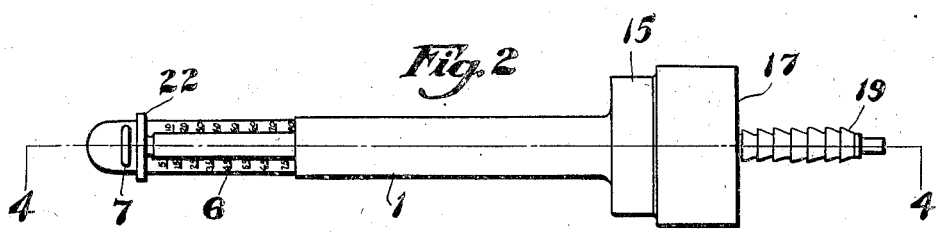
Figure 2 is an enlarged top view of the automatic air gauge.
Figure 3:
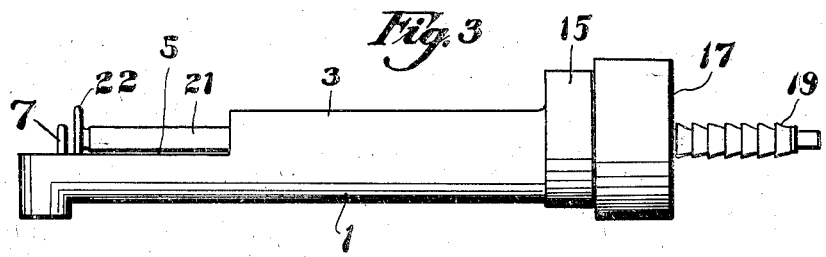
Figure 3 is a horizontal side view of the air gauge.

The details of construction and operation of the invention are as follows:

A tubular body 1 having a longitudinal air passage 2 has superposed upon it a second barrel or tubular body 3 which has a bore 4 parallel to the passage 2. The barrel 3 is considerably less in length than the tubular body 1 and upon the upper face 5 of the tubular body 1 which extends beyond the barrel 3 is a scale 6 indicating pounds of air pressure. Near the end of the tubular body 1 is rigidly fixed a stop 7, the purpose of which will hereinafter appear.

The end 8 of the tubular body 1 forms an elbow having an opening 9 adapted to receive a tire valve stem 10. A suitable rubber gasket 11 is disposed within the opening 9 and a member 12 having a T-shaped cross section is adapted to seat upon the rubber gasket 11. The member 12 has vertical apertures 13 which communicate from the passage 2 to the opening 9, thus affording a passage for air into the valve stem 10.

At the opposite end of the tubular body 1 and the barrel 3 an enlarged annular shoulder 15 formed integral with the tubular body and the barrel having a threaded end 16 is adapted to be coupled with a cap 17 which has internal threads adapted to engage the threads 16. When the cap 17 is screwed tight upon the annular shoulder 15 there is provided a chamber 18. A fitting 19, adapted to receive the end of an air hose (not shown), is screw threaded into the end of the cap 17. A check valve having a stem 20$^a$ is slidably mounted in the fitting 19 and is normally held on a seat 20$^b$ by an expansion coil spring 20$^c$. It will be seen that compressed air may pass through the fitting 19 and the check valve 20 into the chamber 18 and thence through the passage 2 to the valve tire stem 10.

Adapted to slidingly operate within the chamber 4 is a piston 21 at the outer end of which is a flange 22, the lower portion of which is contiguous to the upper surface 5 carrying the scale 6. At the end of the chamber 4, opposite the piston 21, is a valve member 23 which has a substantially conical face 24 adapted to snugly seat in a countersink at the end of the chamber 4. The valve 23 is provided with a pin 26 which is aligned with the stem of the check valve 20. Disposed in the bore 4 between the valve 23 and the piston 21 is a coil expansion spring 27 which is of predetermined tension with reference to the pressure scale.

Figure 4:
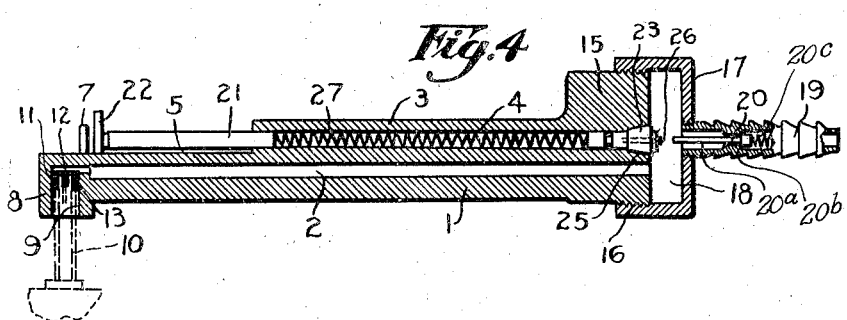
Figure 4 is a horizontal sectional view of the air gauge taken on the line 4—4 of Figure 2.

In the operation of the air gauge the elbow end 8 should be applied with the opening 9 enclosing the tire valve stem 10. The piston 21 is then moved by manually operating the flange 22 until the position of the flange corresponds to the indication on the scale 6 providing for the desired air pressure and the piston should be held in this position by the thumb or another digit of the hand. It will be noted that the least pressure is indicated at the outer end of the tubular body 1 and the greatest pressure adjacent the end of the barrel 3, thus the farther the piston 21 is moved inwardly of the bore 4 the greater pressure is exerted upon the spring 27, which in turn forces the valve member 23 out of the valve seat causing the pin 26 to engage the check valve 20. This opens the air passage through the nipple 19 and compressed air will then pass through the chamber 18, the passage 2 and the apertures 13, thence into the valve stem 10. When the air pressure in the tire 30 equals the tension exerted by the spring 27 pushing against the valve member 23 the reaction of the air pressure within the chamber 18 will cause the valve member to advance against the pressure of the spring and thereby releasing the check valve 20 which will close and prevent further air from being discharged into the tire. When the air gauge is not in use the piston 21 should be withdrawn as indicated in Figure 4, the stop 7 preventing the piston from dropping out of the bore 4.

The accuracy of the automatic air gauge resides in the compilation of the scale 6 with reference to the strength of the spring 27.

Various changes may be made without departing from the spirit of the invention as claimed.

What is claimed is:

1. An automatic air gauge having an elongated body with a piston passage therethrough part way, an upper face at the rear end of the piston passage, an air passage leading to a source of air supply, an air passage leading to a tire valve, a piston in the rear portion of the piston passage, a scale on the upper face of the body, means on the piston to register with the scale, a valve in the other end of said piston passage, a spring between the valve and the piston and a check valve in the air passage from the source of supply positioned to be acted upon by the valve in the piston passage.

2. An automatic air gauge as claimed in claim 1, in which the air passage to the tire valve extends longitudinally through the body from end to end substantially parallel to the piston passage.

3. An automatic air gauge as claimed in claim 1, in which the air passage to the tire valve extends longitudinally through the body from end to end substantially parallel to the piston passage and the passage from the source of supply is mounted on a cap screw threaded on the end of the body.

4. An automatic air gauge comprising a tubular body having a longitudinal air passage therethrough from end to end, a barrel adjacent said tubular body and having a chamber parallel with said air passage, a piston adapted to slide in said chamber and a valve member adapted to seat at the opposite end of the chamber from the piston, a spring in the chamber between the piston and the valve member, a compressed air conduit mounted at the end of said barrel and a check valve in said conduit aligned with said valve member, the valve member being adapted to engage the check valve, to open the same and to be retracted and to allow the check valve to close.

5. An automatic air gauging adapted to be interposed between a portion of compressed air and a pneumatic tire comprising a tubular body having an air passage formed therein from end to end, a barrel formed integral on said body having a bore extending therethrough parallel with said air passage, a piston extending into one end of said bore, a valve member mounted in the opposite end of said bore, an expansion spring within said bore and engaging the end of said piston and valve member, a cap mounted on the end of said body forming an air chamber, a fitting mounted on the end of said cap directly opposite said valve member, a check valve slidably mounted in said fitting having a stem projecting into said chamber, an openng formed in the end of said body adapted to receive the end of a tire valve and a stop mounted on said body adapted to prevent said piston from dropping out of said bore, said piston adapted to be manually operated and adapted to move said valve member into engagement with the stem of said check valve and open a passage through the fitting, and the air passage in the body.

6. An automatic air gauge comprising an elongated tubular body having an air passage formed therein from end to end and an opening at its outer end and at right angles to said air passage adapted to receive the end of a tire valve, a barrel formed integral with said body, having a bore therein parallel with said air passage, a piston extending into said bore and having a flange at its outer end and adapted to register with indices of a scale formed on said body, a valve member mounted in said bore, an expansion spring within said bore, between said piston and valve member, a cap mounted on the end of said body forming a chamber therein, a fitting mounted in the end of said cap, a valve having a stem carried by said fitting and adapted to be held in engagement with the seat formed therein by an expansion spring, said valve member adapted to engage the valve stem of said valve and open said valve when said piston is manually operated and moved into said bore, the valve member adapted to be returned to its normal position when the air pressure within the chamber is equal to the pressure within the tire, and allow the said valve to close and cut off the air pressure entering the chamber.

7. An automatic air gauge as claimed in claim 1, having in addition means on the end of the piston adapted to be engaged by a finger to operate the piston in a straight line motion to register with the indicating marks on the scale.

In testimony whereof I have signed my name to this specification.

CHARLES E. BRIDGES.